United States Patent [19]
Saka et al.

[11] Patent Number: 5,608,271
[45] Date of Patent: Mar. 4, 1997

[54] ELECTRIC CURRENT DISTRIBUTION SYSTEM FOR AUTOMOTIVE VEHICLES

[75] Inventors: Yuuji Saka; Takahiro Onizuka, both of Yokkaichi, Japan

[73] Assignee: Sumitomo Wiring Systems, Ltd., Yokkaichi, Japan

[21] Appl. No.: 520,608

[22] Filed: Aug. 30, 1995

[30] Foreign Application Priority Data

Sep. 1, 1994 [JP] Japan .................................. 6-208920

[51] Int. Cl.⁶ ..................................................... G06F 17/00
[52] U.S. Cl. ...................... 307/10.1; 307/9.1; 364/424.04
[58] Field of Search ..................... 307/9.1–10.8, 307/11, 31, 38, 39, 40, 41, 42, 112, 116, 126, 125, 139, 140, 147; 364/492, 493, 424.01, 424.02, 424.03, 424.04, 424.05; 439/76.1, 76.2; 180/287; 340/825.3, 825.31, 825.34; 235/382; 361/601, 622, 627, 641

[56] References Cited

U.S. PATENT DOCUMENTS 5,091,856  2/1992  Hasegawa ............................ 364/424.05
5,113,344  5/1992  Kellogg ............................... 364/424.04
5,513,107  4/1996  Gormley .............................. 364/424.05

FOREIGN PATENT DOCUMENTS 6-97684  4/1994  Japan .

Primary Examiner—William M. Shoop, Jr.
Assistant Examiner—Peter Ganjoo
Attorney, Agent, or Firm—Anthony J. Casella; Gerald E. Hespos

[57] ABSTRACT

An electric current distribution system is provided for a plurality of types of automotive vehicles. The distribution system is installed in a vehicle compartment and distributes current from an input terminal to loads (6) via a plurality of output terminals. The distribution system includes a box (10) having input terminals at least equal in number to the maximum number of output terminals necessary for the different types of vehicles. A reading device (12) is provided in the box (10) for reading vehicle specific data stored in a memory (11) that may be outside the box (10), for storing in advance the vehicle specific data for each type of vehicle. A controller (16) is provided in the box (10), and receives the vehicle specific data from the reading device (12), specifies which output terminals out of the plurality of output terminals are to be used and outputs a corresponding control signal. A current regulator (18) is provided in the box (10), for regulating the currents supplied from the specified output terminals to the respective loads (6) connected with the specified output terminals in accordance with the control signal.

7 Claims, 2 Drawing Sheets

ତ5,608,271

ELECTRIC CURRENT DISTRIBUTION SYSTEM FOR AUTOMOTIVE VEHICLES

BACKGROUND OF THE INVENTION

1. Field of the Invention

The present invention relates to an electric current distribution system for automotive vehicles which is installed in a vehicle compartment and distributes an electric current supplied to its input terminal to a plurality of loads via a plurality of output terminals.

2. Description of the Prior Art

The prior art electric current distribution system installed in a compartment of an automotive vehicle is, for example, constructed as shown in FIG. 2. Specifically, a plurality of input terminals of a junction box 1 installed in the vehicle compartment are connected with a plurality of output terminals via series circuits each consisting of a fuse FS and a relay RL, via fuses FS, or directly. The respective input terminals of the junction box 1 are connected with a front wiring harness 3 via a connector 2, and a current from a battery or other power supply is fed thereto. On the other hand, the output terminals of the junction box 1 are connected with series circuits each consisting of a load driving switch SW and a load 6 via a connector 4 and wiring harnesses 5 installed in the vehicle compartment such as a cowl wiring harness, a door wiring harness, and a floor wiring harness. Conclusively, the fuses FS, the relays RL, splices of the wiring harnesses 3 and 5, etc. are taken up by internal circuits of the junction box 1. By suitably turning on any one of the load driving switches SW, the current distributed by the internal circuits of the junction box 1 is supplied to the corresponding load 6.

However, since the position of the junction box 1 as an electric current distribution system, the positions of the switches SW, and the type and number of the loads differ depending upon the type of vehicles, the construction of the internal circuits of the junction box 1 and the number of the input and output terminals differ largely depending upon the type of vehicles. Thus, the junction box 1 needs to be prepared for each type of vehicle, leading to an exceedingly high production cost which includes the costs for a high number of different molds.

Japanese Unexamined Patent Publication No. 6-97684 discloses that control units for controlling a variety of output devices provided in the vehicle are detachably mounted on one motherboard and that circuits required for at least one of the control units are mounted on the motherboard so that some of the circuits can be shared. In the above junction box, some of the circuits may be used for different types of vehicles as disclosed in this publication. However, since the junction box still needs to be prepared for each type of vehicle, the disclosure of this publication does not lead to a reduction in the production cost.

The present invention was developed to solve the above problem, and an object thereof is to reduce a production cost by providing a junction box which can be used for different types of vehicles.

SUMMARY OF THE INVENTION

According to the invention, a storage menas, a reading device, a controller and a current regulator are provided in a box a specified number of input terminals and a plurality of output terminals. In the storage means, there are stored in advance at least vehicle specific data which preferably define which ones of the output terminals are to be used for each type of vehicle and which values of output currents to the respective loads via the output terminals are to be used. Preferably, the storage means comprises a floppy disk or a magnetic tape. The output terminals to be used are specified and the currents output therefrom are regulated based on the vehicle specific data corresponding to the type of the vehicle in which the distribution system is installed. Thus, since one box can be used for different type of vehicle, it is not necessary to prepare a junction box for each types of vehicles as in the prior art. This leads to a reduced production cost.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PREFERRED EMBODIMENT

Figure 1:
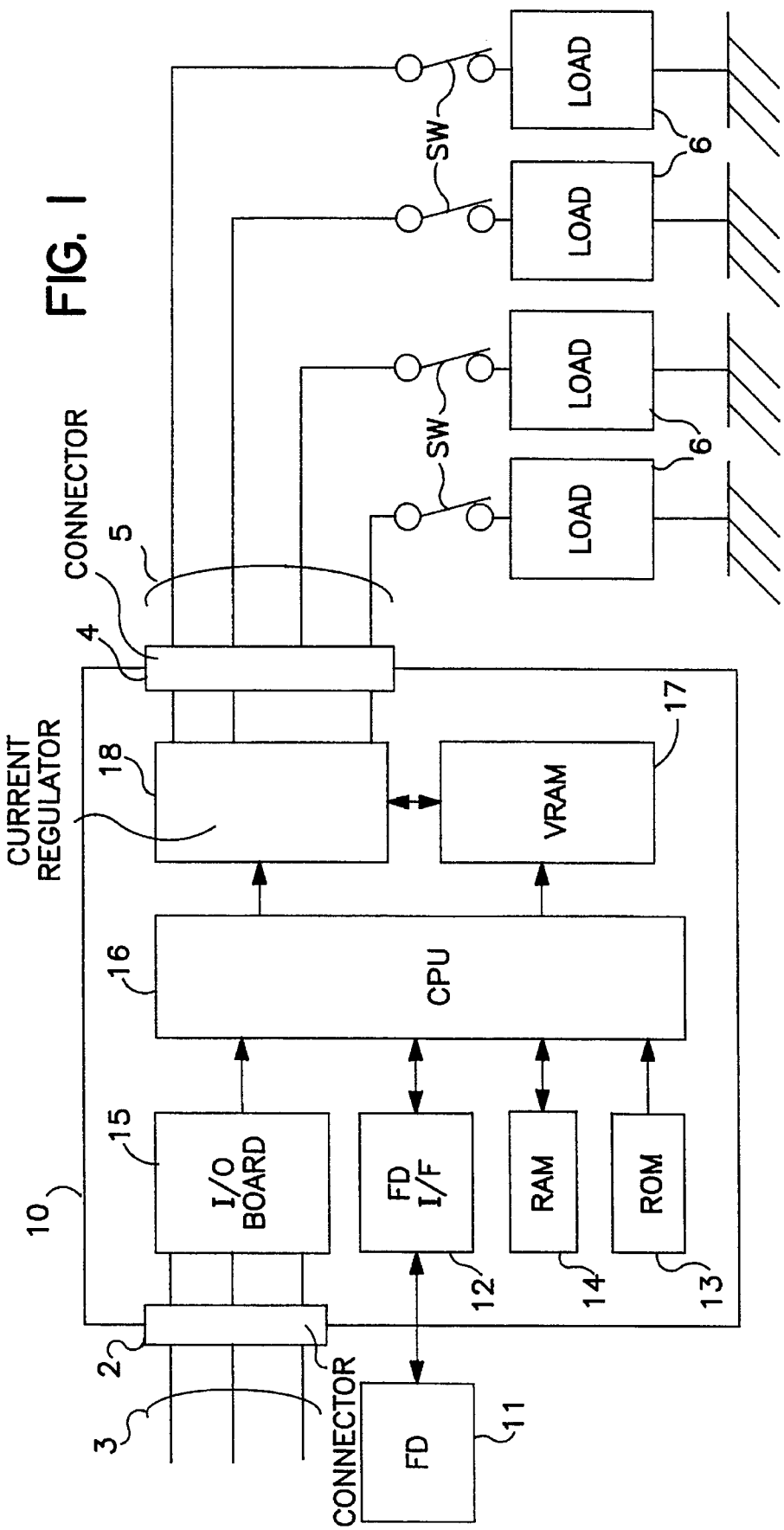
FIG. 1 is a connection diagram of one embodiment according to the invention.
Figure 2:
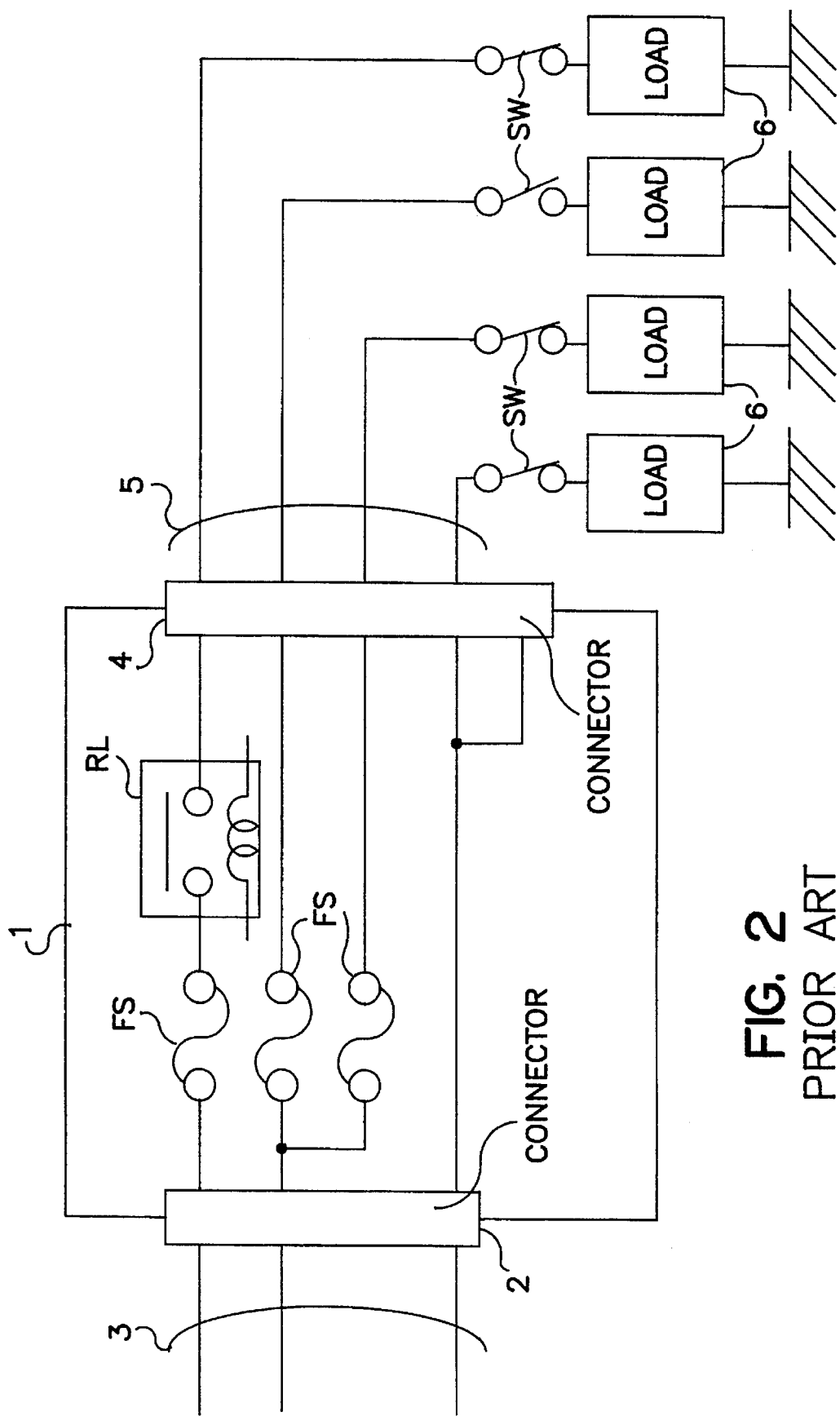
FIG. 2 is a connection diagram of a prior art.

As shown in FIG. 1, a junction box 10 installed in a vehicle compartment has a specified number of input terminals and a number of output terminals, which corresponds to the maximum number among a variety of types of vehicles. There is provided a floppy disk 11 (hereafter, FD) as storage means for storing in advance data concerning which ones of the output terminals of the junction box 10 are to be used for the respective types of vehicles and data concerning output current values to be used for the respective loads 6 via the respective output terminals. The FD 11 is not incorporated in the junction box 10. In the junction box 10, there are provided a FD interface (hereafter, FD-I/F) 12 as a reading device for reading data stored in the FD 11, a ROM 13 for storing a variety of processing programs, a RAM 14 for storing processed data, an I/O board 15 connected with a front wiring harness 3 via a connector 2, a CPU 16 as a controller, a VRAM 17 used to regulate an output current under the control of the CPU 16, and a current regulator 18. The CPU 16 specifies the output terminals to be used and outputs a control signal for controlling the output currents from the specified output terminals based on the output terminal data and the output current data read by the FD-I/F 12. In accordance with the control signal, the current regulator 18 regulates the currents from the output terminals specified by the CPU 16 to the respective loads 6 connected with the specified output terminals to have predetermined values represented by the output current data.

With the above construction, the CPU 16 can specify which ones of the output terminals of the junction box 10 are to be used for the type of a vehicle in which the junction box 10 is installed, only by reading the data stored in the FD 11 by means of the FD-I/F 12, and the current regulator 18 automatically regulates the output currents from the specified output terminals using the data stored in the VRAM 17.

Accordingly, since one box can be used for different types of vehicles, it is not necessary to prepare a box for each type of vehicles as the prior art. Thus, the production cost can be reduced.

It should be appreciated that the storage means is not limited to the above-mentioned FD, but may be a magnetic tape, a magnetic card, an IC card, or other functionally comparable storage means.

What is claimed is:

1. An electric current distribution system for a plurality of types of automotive vehicles which is adapted to distribute a current supplied to an input terminal thereof to a plurality of loads (6) via a plurality of corresponding output terminals thereof, comprising:

- a box (10) having a specified number of input terminals and a plurality of output terminals and being installable in a vehicle compartment, the number of output terminals being selected to at least equal a maximum number of output terminals necessary for the plurality of types of vehicles,
- a reading device (12) provided in the box (10) for reading vehicle specific data stored in a storage means (11) for storing in advance the vehicle specific data for each of the plurality of types of vehicles,
- a controller (16) provided in the box (10), which receives the vehicle specific data from the reading device (12) and specifies which output terminals out of the plurality of output terminals are to be used and outputs a corresponding control signal, and
- a current regulator (18) provided in the box (10), for regulating currents supplied from the specified output terminals to the respective loads (6) connected with the specified output terminals in accordance with the control signal.

2. An electric current distribution system according to claim 1, wherein the vehicle specific data comprise output terminal data indicating which vehicle specific output terminals out of the plurality of output terminals are to be used, and output current data indicating the vehicle specific values of the output currents to be supplied via the vehicle specific output terminals.

3. An electric current distribution system according to claim 1, wherein the storage means (11) comprises a floppy disk (FD).

4. An electric current distribution system according to claim 1, wherein the storage means comprises a magnetic tape.

5. An electric current distribution system according to claim 2, wherein the storage means (11) comprises a floppy disk (FD).

6. An electric current distribution system according to claim 2, wherein the storage means comprises a magnetic tape.

7. An electric current distribution system according to claim 1, wherein the storage means (11) is disposed externally of said box and is electrically connected to said reading device (12).

* * * * *